United States Patent
Reba

(10) Patent No.: US 11,199,107 B2
(45) Date of Patent: Dec. 14, 2021

(54) AIRFOIL-MOUNTED RESONATOR

(71) Applicant: Raytheon Technologies Corporation, Farmington, CT (US)

(72) Inventor: Ramons A. Reba, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 47 days.

(21) Appl. No.: 16/846,981

(22) Filed: Apr. 13, 2020

(65) Prior Publication Data

US 2021/0317753 A1   Oct. 14, 2021

(51) Int. Cl.
 *F01D 25/04* (2006.01)
 *F01N 1/02* (2006.01)

(52) U.S. Cl.
 CPC .............. *F01D 25/04* (2013.01); *F01N 1/023* (2013.01); *F05D 2260/963* (2013.01)

(58) Field of Classification Search
 None
 See application file for complete search history.

(56) References Cited

U.S. PATENT DOCUMENTS

| 7,607,287 | B2 | 10/2009 | Reba et al. |
| 9,359,901 | B2 | 6/2016 | Evans et al. |
| 2008/0295518 | A1* | 12/2008 | Reba ........................ F01D 9/02 60/725 |
| 2014/0373548 | A1* | 12/2014 | Hasselqvist .............. F23M 9/06 60/737 |
| 2017/0314433 | A1* | 11/2017 | You ........................... F01N 1/02 |
| 2018/0245515 | A1* | 8/2018 | Roach ..................... B32B 27/34 |
| 2018/0245516 | A1* | 8/2018 | Howarth ............... B32B 27/322 |
| 2019/0304428 | A1* | 10/2019 | Sandiford ............ G10K 11/172 |

FOREIGN PATENT DOCUMENTS

| CN | 206489873 U | 9/2017 |
| EP | 1612769 A2 | 1/2006 |
| EP | 1752637 A2 | 2/2007 |
| GB | 2005384 A | 4/1979 |
| GB | 2024380 A | 1/1980 |
| GB | 2361035 A | 10/2001 |
| WO | 2005100753 A1 | 10/2005 |

OTHER PUBLICATIONS

European Search Report for European Application No. 21168202.6, dated Aug. 4, 2021, 9 pages.

* cited by examiner

*Primary Examiner* — Michael Lebentritt
(74) *Attorney, Agent, or Firm* — Cantor Colburn LLP

(57) ABSTRACT

Acoustic treatments for components of gas turbine engines are described. The acoustic treatments include an acoustic resonator having a backing chamber defining a respective volume and a neck arranged relative to the backing chamber and defining an opening, wherein the neck has a length and a cross-sectional area. The acoustic resonator cell satisfies the following relationships: (1) l/L=0.2-0.8, where l is a length of the neck and L is a depth of the backing chamber and (2) a/A=0.02-0.20, where a is a cross-sectional area of the neck and A is a cross-sectional area of the backing chamber.

20 Claims, 8 Drawing Sheets

AIRFOIL-MOUNTED RESONATOR

BACKGROUND

The subject matter disclosed herein generally relates to gas turbine engines and, more particularly, to acoustic impedance control features of airfoils for attenuating or dampening noise in a gas turbine engine.

Gas turbine engines often include a bypass duct, especially engines used for commercial aerospace applications. A fan assembly can draw air into the engine, and a portion of that air is diverted through the bypass duct. Fan exit guide vanes (FEGVs) extend into the bypass duct downstream of the fan assembly. These FEGVs provide an aerodynamic function in straightening or otherwise interacting with airflow from the fan assembly, and a structural function in delivering mechanical support in a generally radial direction across the bypass duct.

However, noise produced by gas turbine engines is a concern. Noise generated by fan-wake/vane interaction is a significant contributor to the effective perceived noise level (EPNL) of gas turbine engines. Such noise problems can occur when wakes of the upstream fan assembly impinge on the FEGVs, thereby providing a mechanism for converting non-acoustic vortical disturbances (i.e., the fan wake) into propagating pressure disturbances (i.e., sound).

Acoustic liners may be applied to airfoils to reduce the amount of noise generated by operation of gas turbine engine fans. Conventional acoustic liners rely on quarter-wave resonances of straight constant-area channels. This type of liner is the current industry standard for engine and nacelle acoustic treatment, typically constructed by bonding a perforated face sheet to a honeycomb structure. The honeycomb cells in such architectures form an array of quarter-wave resonators.

Practical space constraints often preclude use of optimum resonator length (e.g., honeycomb cell depth). In particular, deployment of acoustic treatment in Fan Exit Guide Vanes (FEGVs) poses a challenge due to constraints on airfoil thickness, requiring specific, non-optimal, orientation of the resonator channels. Additionally, an inherent drawback of such architectures is that only a fraction of the exposed airfoil surface can be treated. Accordingly, it may be beneficial to have improved acoustic treatment for airfoils and other gas turbine engine structures (e.g., nacelles).

SUMMARY

According to some embodiments, acoustic treatments for components of gas turbine engines are provided. The acoustic treatments include an acoustic resonator having a backing chamber defining a respective volume and a neck arranged relative to the backing chamber and defining an opening, wherein the neck has a length and a cross-sectional area. The acoustic resonator cell satisfies the following relationships: (1) l/L=0.2-0.8, where l is a length of the neck and L is a depth of the backing chamber and (2) a/A=0.02-0.20, where a is a cross-sectional area of the neck and A is a cross-sectional area of the backing chamber.

In addition to one or more of the features described above, or as an alternative, further embodiments of the acoustic treatments may include that a plurality of acoustic resonator cells are arranged to form an acoustic resonator insert.

In addition to one or more of the features described above, or as an alternative, further embodiments of the acoustic treatments may include that the acoustic resonator insert is installed to an airfoil.

In addition to one or more of the features described above, or as an alternative, further embodiments of the acoustic treatments may include that the acoustic resonator insert is installed to a nacelle component.

In addition to one or more of the features described above, or as an alternative, further embodiments of the acoustic treatments may include that the acoustic resonator includes a first acoustic resonator cell and a second acoustic resonator cell. The first acoustic resonator cell comprises the backing chamber and the neck and the second acoustic resonator cell comprises a respective second backing chamber and a respective second neck. The first acoustic resonator cell is stacked on the second acoustic resonator cell and the first backing chamber and the second backing chamber are fluidly connected through the second neck.

In addition to one or more of the features described above, or as an alternative, further embodiments of the acoustic treatments may include that the neck is arranged inside the backing chamber.

In addition to one or more of the features described above, or as an alternative, further embodiments of the acoustic treatments may include that the opening is the only fluid connection from an external environment into the backing chamber.

In addition to one or more of the features described above, or as an alternative, further embodiments of the acoustic treatments may include that the neck is arranged outward from the backing chamber and does not extend into the backing chamber.

In addition to one or more of the features described above, or as an alternative, further embodiments of the acoustic treatments may include that the acoustic resonator is integrally formed with the component.

In addition to one or more of the features described above, or as an alternative, further embodiments of the acoustic treatments may include a face sheet, wherein the opening is defined in the face sheet and an outer perforated sheet arranged opposite the backing chamber relative to the face sheet. A second volume is defined between the face sheet and the outer perforated sheet and the outer perforated sheet is configured to be exposed to an external environment during operation.

According to some embodiments, acoustic treatment inserts for components of gas turbine engines are provided. The acoustic treatment inserts include a face sheet, an insert frame, wherein the face sheet is attached to the insert frame, and an acoustic resonator arranged between the face sheet and a back of the insert frame. The acoustic resonator include a backing chamber defining a respective volume and a neck arranged relative to the backing chamber and defining an opening, wherein the neck has a length and a cross-sectional area. The acoustic resonator cell satisfies the following relationships: (1) l/L=0.2-0.8, where l is a length of the neck and L is a depth of the backing chamber and (2) a/A=0.02-0.20, where a is a cross-sectional area of the neck and A is a cross-sectional area of the backing chamber.

In addition to one or more of the features described above, or as an alternative, further embodiments of the acoustic treatment inserts may include that a plurality of acoustic resonator cells are arranged within the acoustic treatment insert.

In addition to one or more of the features described above, or as an alternative, further embodiments of the acoustic treatment inserts may include that the acoustic resonator insert is installed to an airfoil.

In addition to one or more of the features described above, or as an alternative, further embodiments of the acoustic treatment inserts may include that the acoustic resonator insert is installed to a nacelle component.

In addition to one or more of the features described above, or as an alternative, further embodiments of the acoustic treatment inserts may include that the acoustic resonator includes a first acoustic resonator cell and a second acoustic resonator cell. The first acoustic resonator cell comprises the backing chamber and the neck and the second acoustic resonator cell comprises a respective second backing chamber and a respective second neck. The first acoustic resonator cell is stacked on the second acoustic resonator cell and the first backing chamber and the second backing chamber are fluidly connected through the second neck.

In addition to one or more of the features described above, or as an alternative, further embodiments of the acoustic treatment inserts may include that the neck is arranged inside the backing chamber.

In addition to one or more of the features described above, or as an alternative, further embodiments of the acoustic treatment inserts may include that the opening is the only fluid connection from an external environment into the backing chamber.

In addition to one or more of the features described above, or as an alternative, further embodiments of the acoustic treatment inserts may include that the neck is arranged outward from the backing chamber and does not extend into the backing chamber.

In addition to one or more of the features described above, or as an alternative, further embodiments of the acoustic treatment inserts may include that the opening is defined in the face sheet and an outer perforated sheet is arranged opposite the backing chamber relative to the face sheet, wherein a second volume is defined between the face sheet and the outer perforated sheet and the outer perforated sheet is configured to be exposed to an external environment during operation.

In addition to one or more of the features described above, or as an alternative, further embodiments of the acoustic treatment inserts may include that the face sheet is attached to the insert frame during assembly to define the neck.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
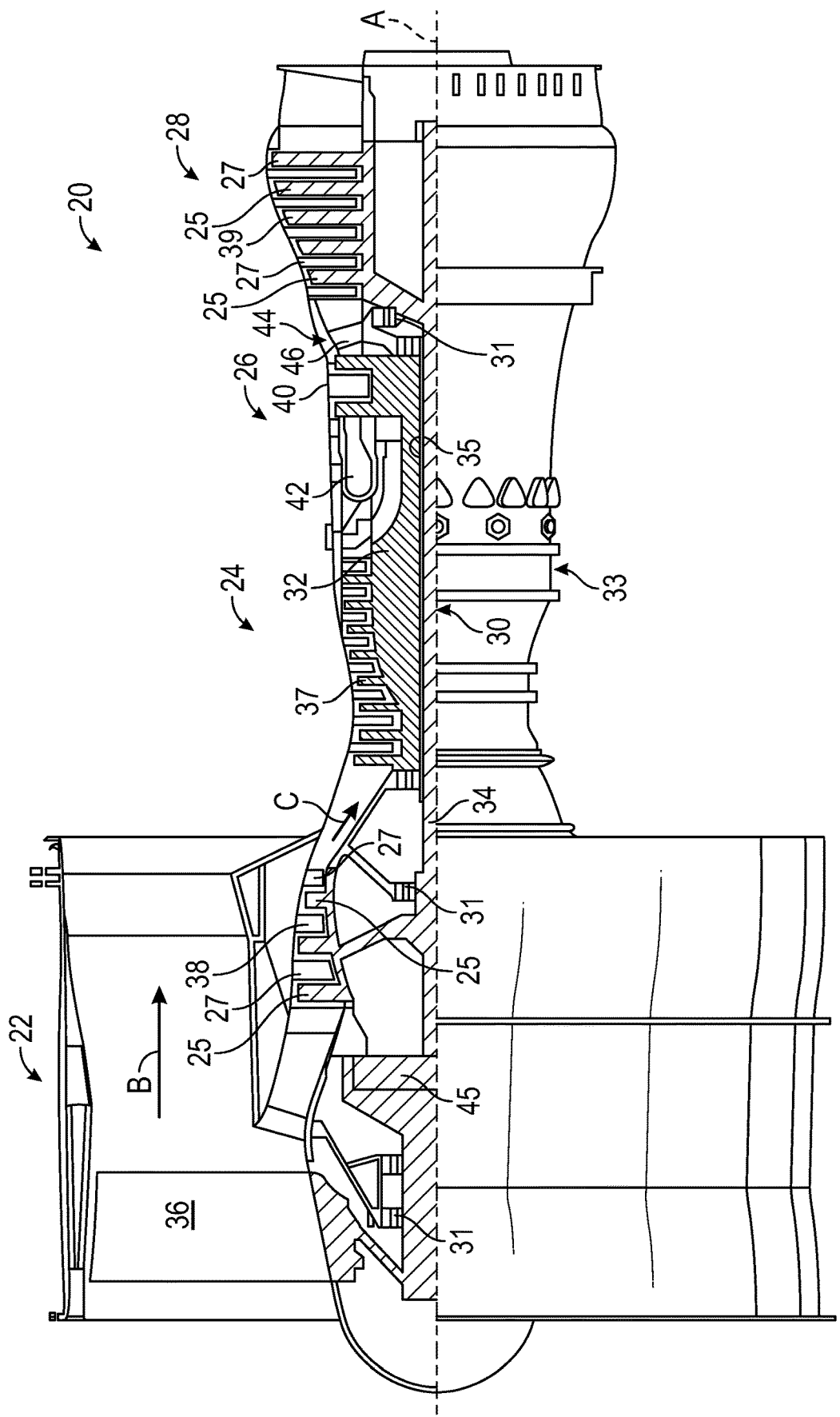
FIG. 1 is a schematic cross-sectional illustration of a gas turbine engine architecture that may employ various embodiments disclosed herein.

FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies add or extract energy from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Although a specific architecture for a gas turbine engine is depicted in the disclosed non-limiting example embodiment, it should be understood that the concepts described herein are not limited to use with the shown and described configuration, as the teachings may be applied to other types of engines such as, but not limited to, turbojets, turboshafts, and other turbofan configurations (e.g., wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT")).

Figure 2:
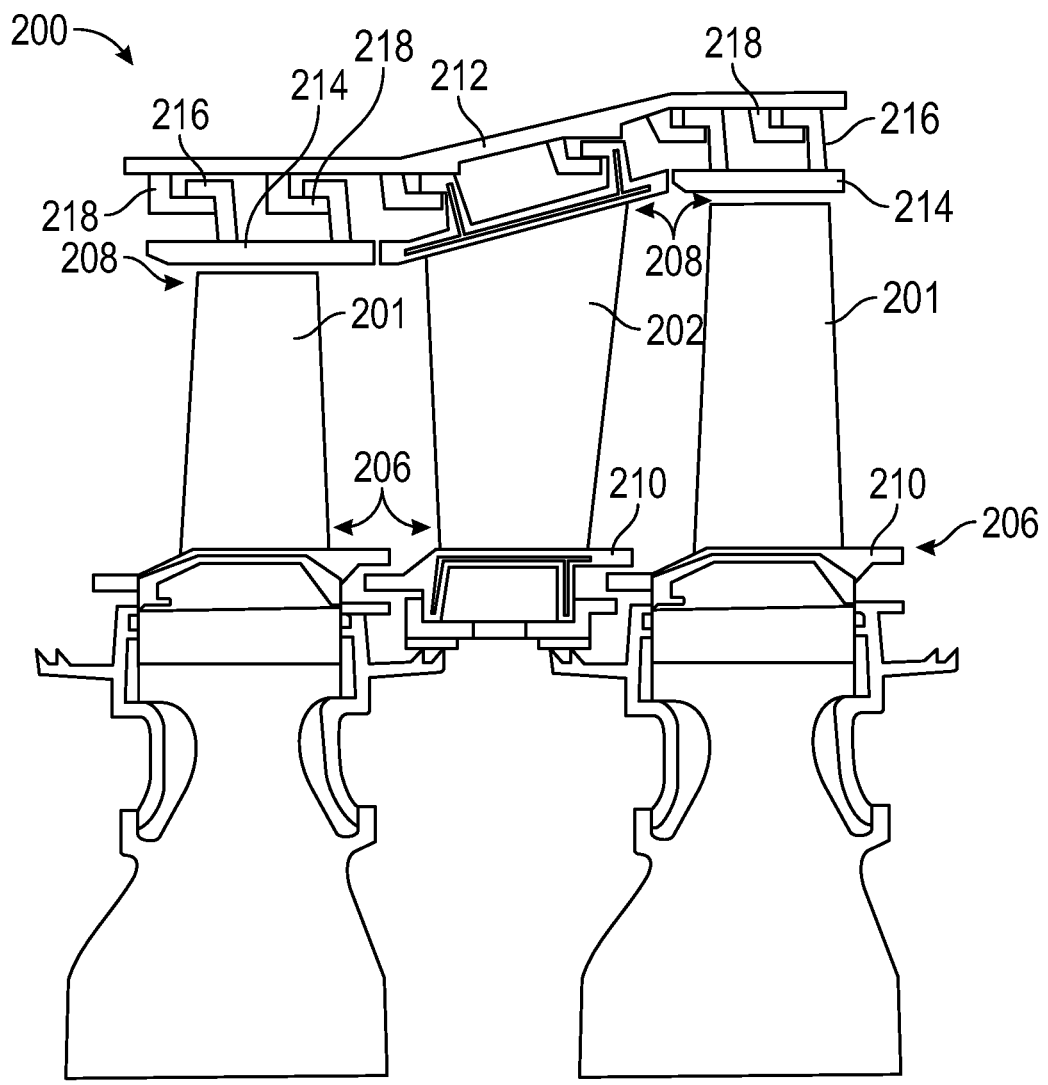
FIG. 2 is a schematic illustration of a section of a gas turbine engine that may employ various embodiments disclosed herein.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions within the airfoils 201, 202 that may extend either from the inner diameter 206 or the outer diameter 208 of the airfoil 201, 202. The partitions may extend for a portion of the length of the airfoil 201, 202, but may stop or end prior to forming a complete wall within the airfoil 201, 202. Thus, each of the airfoil cavities may be fluidly connected and form a fluid path within the respective airfoil 201, 202. The blades 201 and the vanes 202 may include platforms 210 located proximal to the inner diameter thereof. Located below the platforms 210 may be airflow ports and/or bleed orifices that enable air to bleed from the internal cavities of the airfoils 201, 202. A root of the airfoil may connected to or be part of the platform 210.

The turbine 200 is housed within a case 212, which may have multiple parts (e.g., turbine case, diffuser case, etc.). In various locations, components, such as seals, may be positioned between airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

Figure 3:
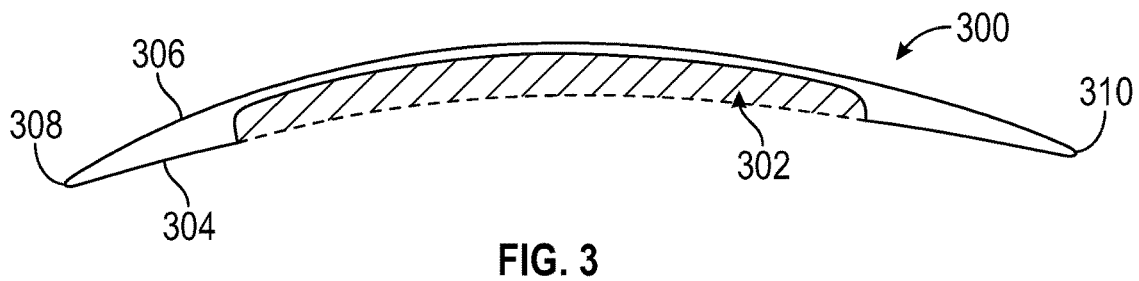
FIG. 3 is a schematic illustration of a component of a gas turbine engine that can incorporate embodiments of the present disclosure.

Turning now to FIG. 3, an airfoil 300 that has an acoustic treatment. As shown, the airfoil 300 includes an acoustic resonator insert 302 installed thereto. The airfoil 300 has an airfoil shape that defines a concave pressure side 304 and an opposite convex suction side 306. The airfoil 300 extends in an engine-axis axial direction between a leading edge 308 and a trailing edge 310. The acoustic resonator insert 302 is attached to the airfoil 300 along the pressure side 304, at a location intermediate between the leading edge 308 and the trailing edge 310. In alternative configurations, the acoustic resonator insert 302 can be attached to an airfoil at other locations (e.g., along the suction side 306). In some embodiments, the airfoil is a fan exit guide vane for a gas turbine engine. It will be appreciated that acoustic resonator insert may be used on other types of airfoils and/or components that are employed in gas turbine engines or associated structures (e.g., nacelle components and structures). Some such acoustic resonator inserts are disclosed in U.S. Pat. No. 7,607,287, entitled "Airfoil Acoustic Impedance Control," which is commonly owned and incorporated herein in its entirety. It will be appreciated that airfoil 300 of FIG. 3 generally represents an airfoil having an acoustic resonator insert installed therein, with some such insert incorporating embodiments of the present disclosure. That is, the acoustic resonator insert 302 illustrated in FIG. 3 may incorporate features described herein.

Figure 4A:
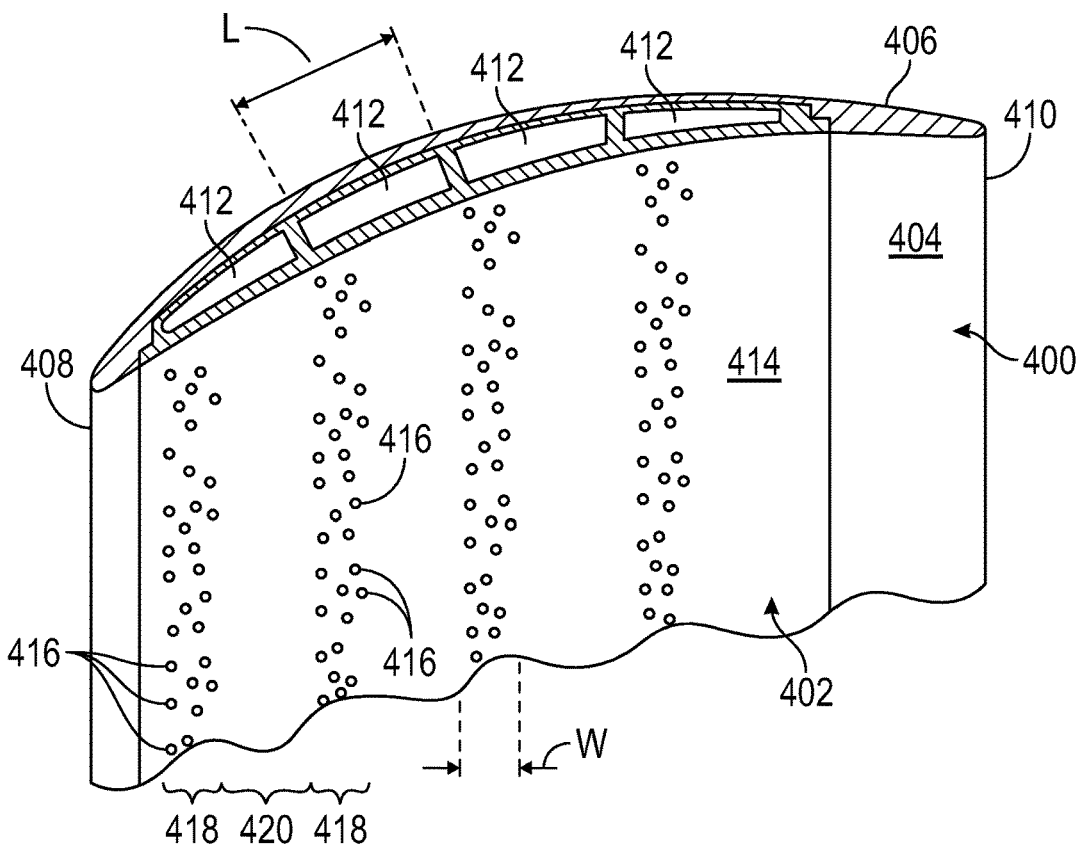
FIG. 4A is a prior art configuration of a component having acoustic treatment applied thereto.
Figure 4B:
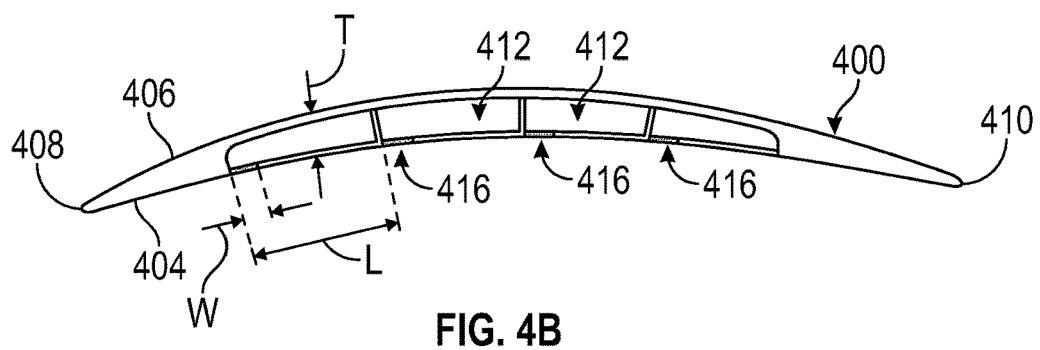
FIG. 4B is a cross-sectional view of the component of FIG. 4A.

Turning to FIGS. 4A-4B, a perspective view of a portion of an airfoil 400 having an acoustic resonator insert 402 installed thereto is shown in FIG. 4A, and a cross-sectional view of the airfoil 400 is shown in FIG. 4B. The configuration shown in FIG. 4 is representative of prior acoustic resonator insert configurations. The airfoil 400 has an airfoil shape that defines a concave pressure side 404 and an opposite convex suction side 406. The airfoil 400 extends in an engine-axis axial direction between a leading edge 408 and a trailing edge 410.

The acoustic resonator insert 402 defines a plurality of internal cells that define resonator cavities 412 which are bounded, in part, by a face sheet 414. The face sheet 414 defines part of an external flow surface of the airfoil 400 when the acoustic resonator insert 402 is installed to the airfoil 400. The resonator cavities 412 are fluidly connected to an external environment through one or more openings 416 in the face sheet 414. The openings 416 may be perforations formed in the face sheet 414, or may be a perforated sub-sheet assembled with the face sheet 414.

As shown, the openings 416 are grouped in rows or columns as perforated regions 418 with non-perforated (solid) regions 420 of the face sheet 414 located between the perforated regions 418 of the openings 416. In the illustrated embodiment, the perforated regions 418 extend in a generally radial direction (e.g., root to tip direction), although in other configurations the perforated regions may extend in a generally axial direction (e.g., leading edge to trailing edge direction). In the illustrated configuration, each perforated region 418 is arranged at a forward side of a respective resonator cavity 412 of the acoustic resonator insert 402. Each perforated region 418 has a width W. The resonator cavities 412 are generally cuboid-shaped (i.e., generally rectangular boxes) extending aftward (toward the trailing edge 410) from the location of a respective perforated region 418. The resonator cavities 412 of the acoustic resonator insert 402 have a length L in a direction from leading edge 408 to trailing edge 410 along the face sheet 414. The length L is the length of a resonator cavity and may be optimized to be a quarter wave resonator. In some configurations, the internal cells may define or have cavities that are straight or constant cross-section area geometries (e.g., in a spanwise direction).

Each resonator cavity 412 has a thickness T in a direction from the pressure side 404 to the suction side 406. Because of the relatively small or low thickness of airfoils, the resonator cavities 412 extend in a generally axial direction, with an entrance to each resonator cavity 412 defined by the perforations of the perforated regions 418 that are exposed to the external environment of the airfoil 400 such that fluid communication (at least acoustic communication) may be provided into the resonator cavities 412. These limitations of available space can limit the fraction of the airfoil 400 that can be treated with acoustic treatment. The fraction of the airfoil that is treatable scales with T/L, and if L is optimized for acoustic damping, the treatment has a lower limit of coverage.

The formation of the acoustic resonator insert 402 typically involves the attachment of the face sheet 414 to a resonator structure, which, in some configurations is a honeycomb structure. The honeycomb structure can maximize the number of cells that are present within the treated component. In some configurations, the honeycomb cells will form an array of quarter-wave resonators. As such, the resonator cavities 412 may have a generally honeycomb (e.g., pentagon) cross-sectional geometry. The length L of the resonator cavities 412 is arranged in a leading edge-to-trailing edge direction to enable the quarter-wave length optimization to be achieved. Because of this and the amount of physical space each resonator cavity occupies to be functional, the number of resonator cavities in a given treatment may be limited.

In accordance with embodiments of the present disclosure, the length of a cavity of an internal cell may be reduced through the principles of Helmholtz resonance. As such, a modified, and improved, internal cell or cavity of an acoustic treatment insert (or acoustic treatment of any component, integrally formed therewith or as an insert/attachment) may be achieved. In accordance with some embodiments of the present disclosure, in addition to a quarter-wave resonator cavity, one or more relatively thin tubes are combined with the resonator cavity. This has the effect of adding acoustic inertia and reducing the resonance frequency for a given cell length (or depth).

Figure 5:
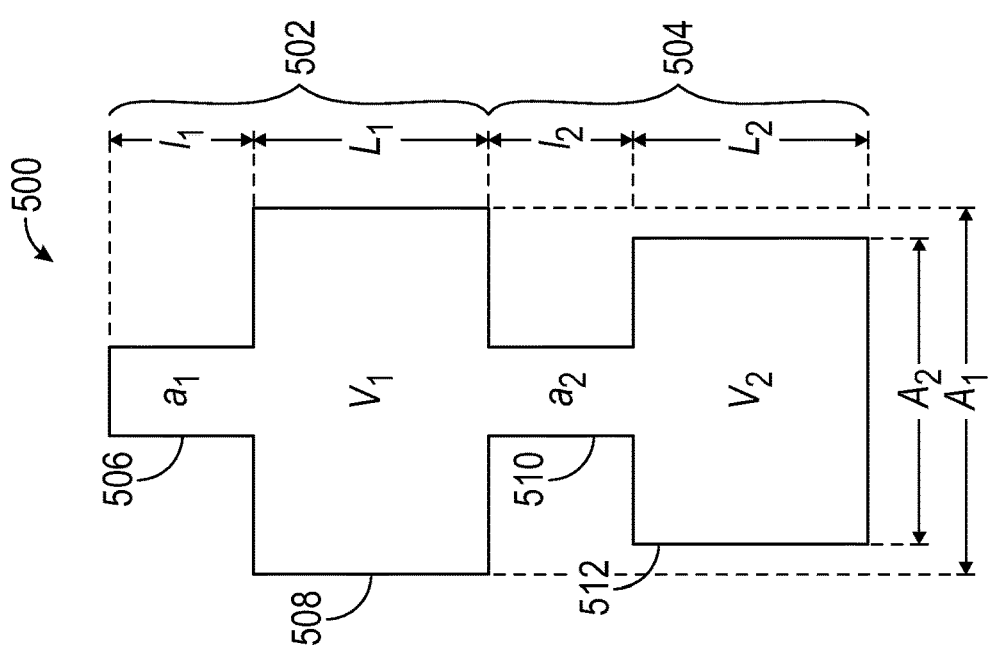
FIG. 5 is a geometric representation of an acoustic resonator in accordance with an embodiment of the present disclosure.

Turning now to FIG. 5, a schematic geometric representation of a resonator 500 in accordance with an embodiment of the present disclosure is shown. The geometric representation of a resonator 500 does not represent a physical structure, per se, but rather is provided for illustrative purposes of the principles of the structures of the resonator cavities in accordance with the present disclosure. The resonator 500 is formed of two resonator cells 502, 504, which are stacked. A first resonator cell 502 includes a respective first neck 506 and a respective first backing chamber 508. A second resonator cell 504 includes a respective second neck 510 and a respective second backing chamber 512. The first neck 506 has a respective first length $l_1$ and a respective first cross-sectional area $a_1$. As such, the volume of the first neck 506 is defined as the first length $l_1$ times the first cross-sectional area $a_1$. The second neck 510 has a respective second length $l_2$ and a respective second cross-sectional area $a_2$. As such, the volume of the second neck 510 is defined as the second length $l_2$ times the second cross-sectional area $a_2$. Further, the first backing chamber 508 of the first resonator cell 502 has a respective first volume $V_1$ and the second backing chamber 512 of the second resonator 504 has a respective second volume $V_2$. The first backing chamber 508 has a respective first cross-sectional area $A_1$ and first backing chamber length $L_1$. The second backing chamber 512 has a respective first cross-sectional area $A_2$ and second backing chamber length $L_2$.

By implementing a neck-configuration, the depth required for optimum acoustic damping tuning can be reduced by the principles of Helmholtz resonance. The backing chambers define a backing volume as would be done in a typical or convention acoustic resonator cell. However, the addition of a thin tube of length l and cross-sectional area a, reduced total volume may be achieved. The neck of the acoustic resonator cells of the present disclosure adds acoustic inertia and reduces the resonance frequency for a given depth, thus allowing for shorter depth backing chambers.

In accordance with embodiments of the present disclosure, each acoustic resonator cell may satisfy the following relationships: (1) l/L=0.2-0.8, where l is a neck length and L is a backing cavity depth or length and (2) a/A=0.02-0.20, where a is the cross-sectional area of the neck and A is the cross-sectional area of the backing cavity.

Figure 6B:
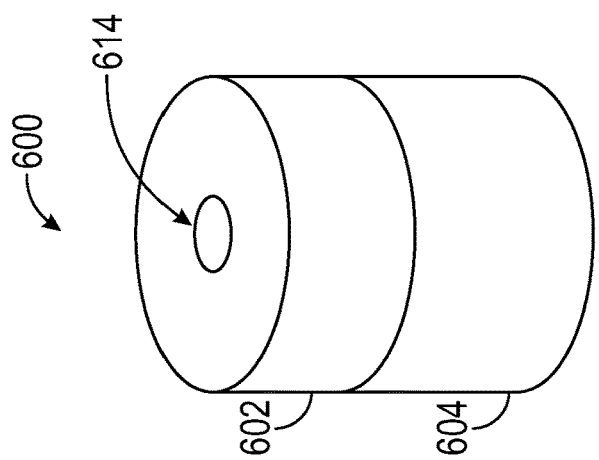
FIG. 6B is an isometric illustration of the acoustic resonator of FIG. 6A.
Figure 6A:
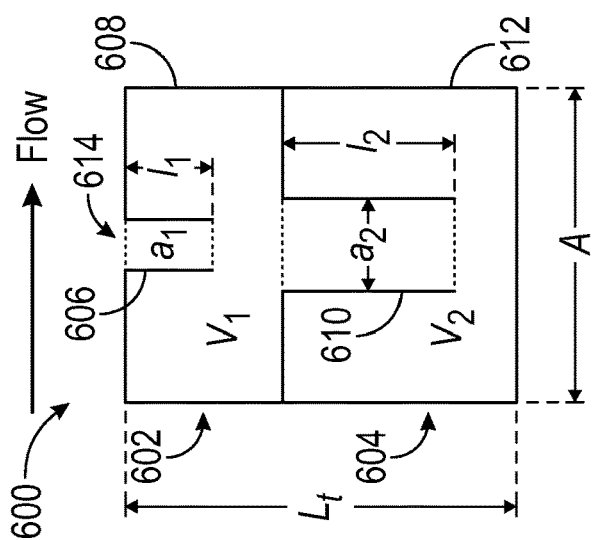
FIG. 6A is a side elevation view of an acoustic resonator in accordance with an embodiment of the present disclosure.

Turning now to FIGS. 6A-6B, schematic illustrations of a resonator 600 in accordance with an embodiment of the present disclosure are shown. FIG. 6A illustrates an elevation cross-sectional view of the resonator 600 and FIG. 6B illustrates an isometric illustration of the resonator 600. The resonator 600 may be a single resonator that is part of an insert, cartridge, or formed within a component of a gas turbine engine (e.g., airfoil, nacelle, etc.). The resonator 600 is arranged such that a portion of the resonator 600 is exposed to a flow of air, as indicated in FIG. 6A. Similar to the geometric illustration of FIG. 5, the resonator 600 is formed of two resonator cells 602, 604, which are stacked. A first resonator cell 602 includes a respective first neck 606 and a respective first backing chamber 608. A second resonator cell 604 includes a respective second neck 610 and a respective second backing chamber 612. The first neck 606 has a respective first length $l_1$ and a respective first cross-sectional area $a_1$ and extends into a respective first volume $V_1$ of the first backing chamber 608. The volume of the first neck 606 is defined as the first length $l_1$ times the first cross-sectional area $a_1$. The second neck 610 has a respective second length $l_2$ and a respective second cross-sectional area $a_2$ and extends into a respective second volume $V_2$ of the second backing chamber 612. The volume of the second neck 610 is defined as the second length $l_2$ times the second cross-sectional area $a_2$. The first neck 606 extends inside or into the first backing chamber 608 and the second neck 610 extends inside or into the second backing chamber 612. In this configuration, both the first resonator cell 602 and the second resonator cell 604 have a cross-sectional area A which is also the cross-sectional area of the backing chambers 608, 612 or the first and second volumes $V_1$, $V_2$.

The respective necks 606, 610 are formed as hollow cylinders that extend into the respective backing chambers 608, 612 of the first and second resonator cells 602, 604. The resonator 600 has an opening 614 that fluidly connects the interior of the resonator 600 with an external flow of air. As such, the complete interior of the resonator 600 is fluidly connected to the exterior environment. Air (or vibrations) will enter into the first neck 606 and pass into the first volume $V_1$. The air (or vibrations) may continue to pass into the second neck 610 and pass into the second volume $V_2$.

Although the resonator 600 of FIGS. 6A-6B is a generally cylindrical shape those of skill in the art will appreciate that other geometries may be used without departing from the scope of the present disclosure. For example, the resonators of the present disclosure may have circular, square, rectangular, polygonal, or other geometric cross-sectional shapes. Further, although shown in FIGS. 5, 6A-6B, with a dual-resonator cell stack, other configurations are possible without departing from the present disclosure. For example, a single resonator cell (e.g., components 604, 610, 612 as a single resonator is encompassed herein). As such, the illustrative embodiments described herein are merely for illustrative and explanatory purposes and are not to be limiting.

With reference to FIG. 6A, a total length $L_t$ of the resonator 600 may be equivalent to a conventional length of a quarter-wave resonator cell. That is, as illustrated, two effective resonator cells (of the present disclosure) may be stacked to enable installation in a location where only a single convention resonator cell may have previously been installed. As such, improved tuning and acoustic damping may be achieved through embodiments of the present disclosure. Furthermore, although only two resonator cells 602, 604, in accordance with other embodiments, any number of resonator cells may be stacked to achieve a desired vibrational and acoustic damping.

Figure 7A:
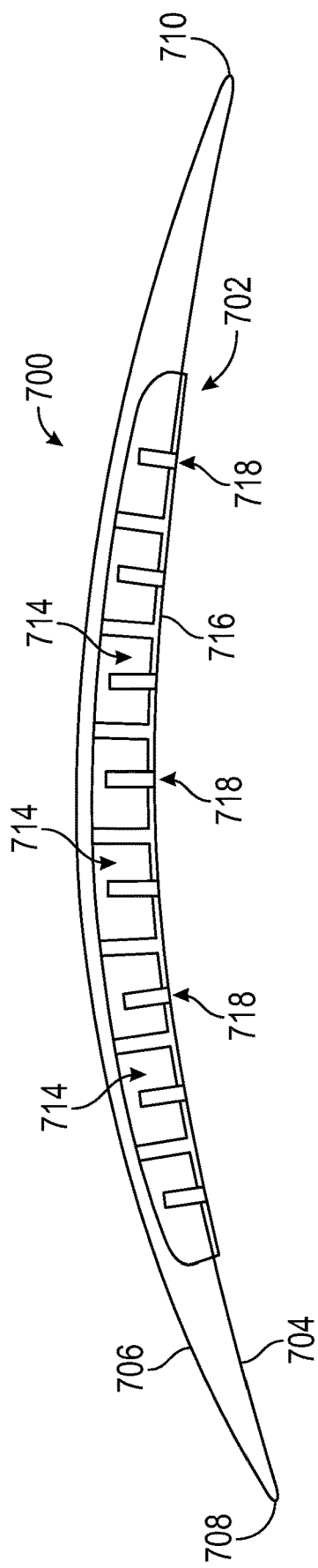
FIG. 7A is a cross-sectional illustration of a component of a gas turbine engine having an acoustic treatment in accordance with an embodiment of the present disclosure.
Figure 7C:
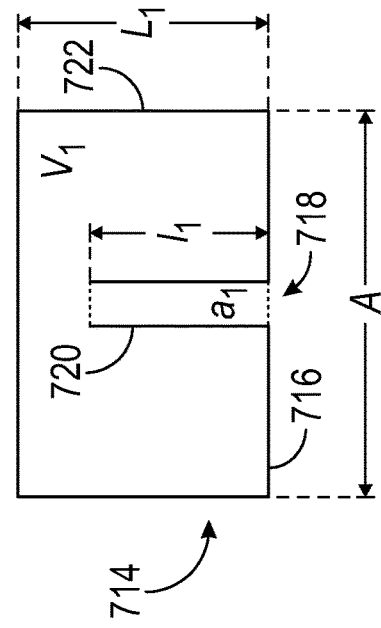
FIG. 7C is an enlarged detailed illustration of an acoustic resonator of the acoustic treatment of FIG. 7A.
Figure 7B:
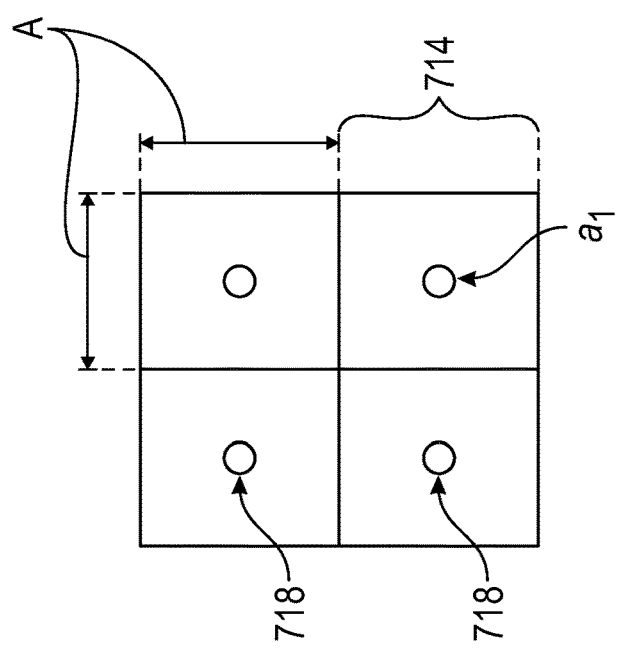
FIG. 7B is a partial elevation view of a portion of the component shown in FIG. 7A.

Turning now to FIGS. 7A-7C, schematic illustrations of an airfoil 700 in accordance with an embodiment of the present disclosure are shown. FIG. 7A illustrates a cross-section of the airfoil 700 and the interior structure thereof, FIG. 7B is a partial elevation view of the airfoil 700, and FIG. 7C illustrates an enlarged view of a portion of the airfoil 700. The airfoil 700 has an airfoil shape that defines a concave pressure side 704 and an opposite convex suction side 706. The airfoil 700 extends in an engine-axis axial direction between a leading edge 708 and a trailing edge 710. An acoustic resonator insert 702 is installed into the airfoil 700 and defines a plurality of resonator cells 714. The acoustic resonator insert 702 includes a face sheet 716 that defines a portion of the airfoil flow surfaces (e.g., exterior surface of the airfoil 700). Although discussed herein as a face sheet construction, such configuration is not to be limiting. In other embodiments of the present disclosure, the acoustic resonator insert 702 may be a uniformly and integral piece that is formed, for example, by additive manufacturing, molds, machining, or other manufacturing processes, as will be appreciated by those of skill in the art. That is, in some embodiments, the illustrated and labeled face sheet 716 may be an integral piece with the rest of the acoustic resonator insert 702, and not necessarily a separately formed and installed piece attached to a backing structure.

The face sheet 716 defines part of an external flow surface of the airfoil 700 when the acoustic resonator insert 702 is installed to the airfoil 700. The resonator cells 714 are fluidly connected to an external environment through one or more openings 718 formed in the face sheet 716. The openings 718 may be perforations formed in the face sheet 716, or may be a perforated sub-sheet assembled with the face sheet 716.

As shown in FIG. 7B, each resonator cell 714 includes a neck 720 and a respective backing chamber 722. The neck 720 includes and defines the opening 718 of the respective resonator cell 714, and fluidly connects the exterior environment to a volume $V_1$ defined within the backing chamber 722. In this illustrative embodiment, the neck 720 has a length of $l_1$ and a cross-sectional area of $a_1$. The backing chamber 722 has a volume $V_1$ with the neck 720 extending into the backing chamber 722. In some embodiments, the openings 718 may be the equivalent of a single perforation in a typical acoustic treatment (e.g., about 0.02 inches in diameter). In accordance with some embodiments of the present disclosure, each resonator cell 714 may be polygonal in cross-section (e.g., honeycomb) and each resonator cell 714 has one, and only one, opening 718 associated therewith. In some embodiments, the neck 720 may have a circular or non-circular cross-sectional geometry, and the illustrative and discussed geometries are not intended to be limiting, but rather are merely for illustrative and explanatory purposes.

Figure 8A:
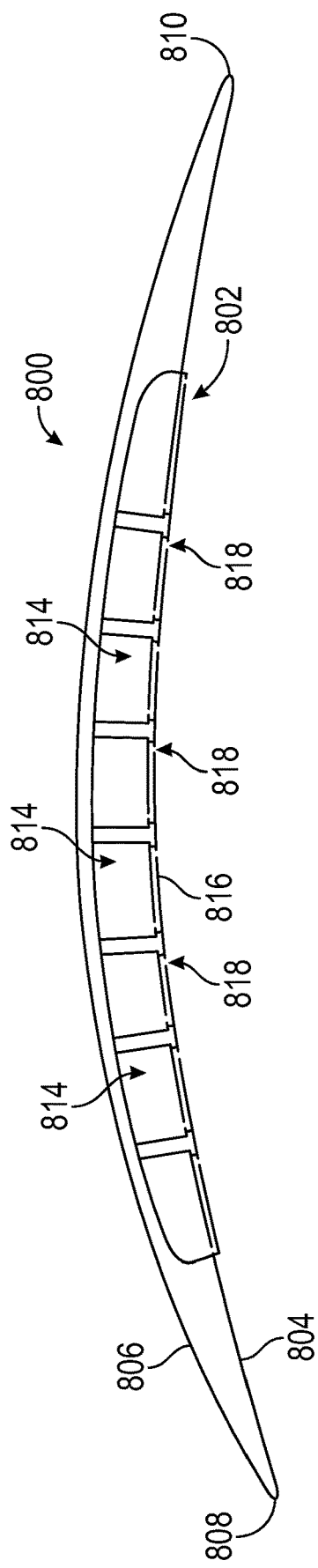
FIG. 8A is a cross-sectional illustration of a component of a gas turbine engine having an acoustic treatment in accordance with an embodiment of the present disclosure.
Figure 8C:
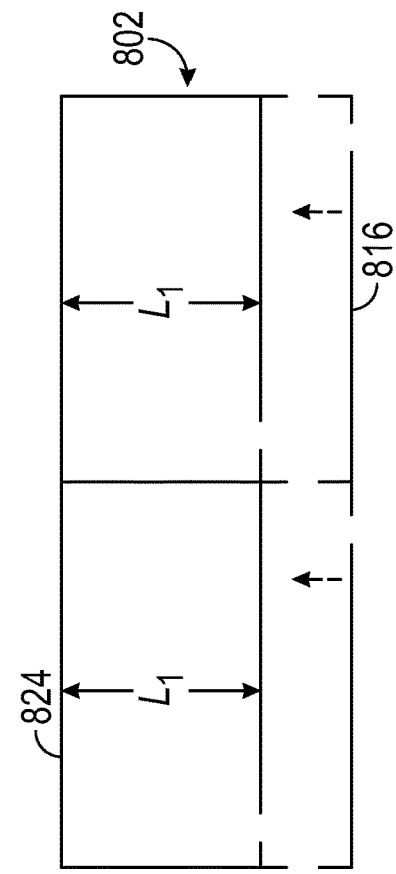
FIG. 8C is a schematic illustration of an assembly process of the acoustic treatment of FIG. 8A.
Figure 8B:
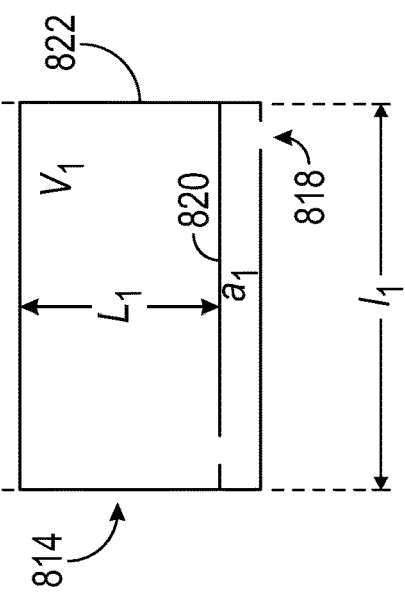
FIG. 8B is an enlarged detailed illustration of an acoustic resonator of the acoustic treatment of FIG. 8A.
Figure 8D:
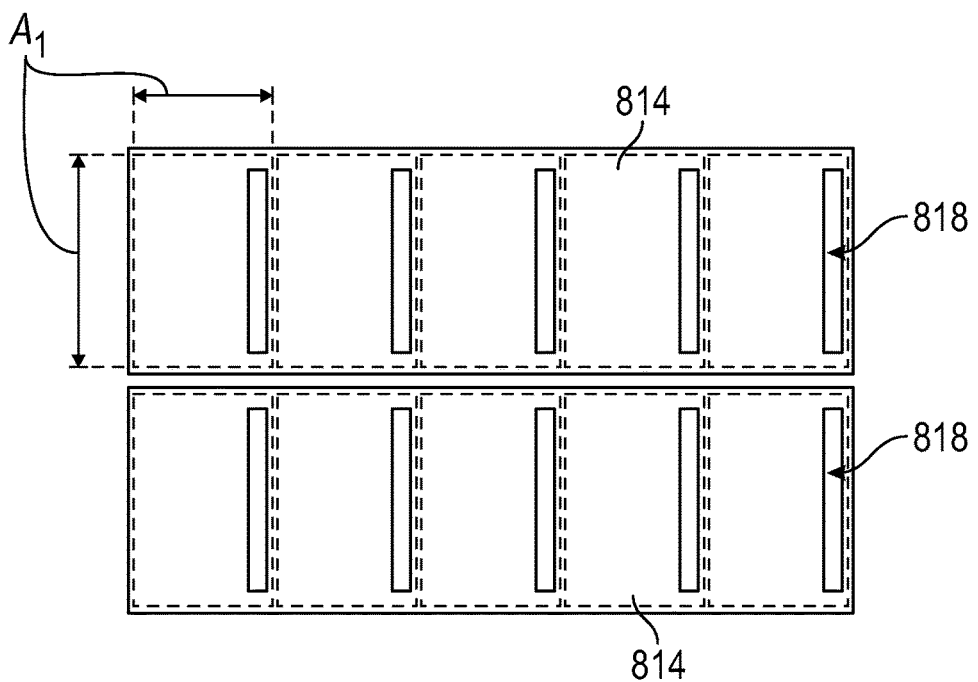
FIG. 8D is a partial elevation illustration of the component of FIG. 8A.

Turning now to FIGS. 8A-8D, schematic illustration of an airfoil 700 in accordance with an embodiment of the present disclosure are shown. FIG. 8A illustrates a cross-section of the airfoil 800 and the interior structure thereof. FIG. 8B illustrates an enlarged view of a resonator cell 814 of the acoustic resonator insert 802, FIG. 8C illustrates an assembly process for an acoustic resonator insert 802 of the airfoil 800, and FIG. 8D illustrate a partial elevation view of the airfoil 800. The airfoil 800 has an airfoil shape that defines a concave pressure side 804 and an opposite convex suction side 806. The airfoil 800 extends in an engine-axis axial direction between a leading edge 808 and a trailing edge 810. An acoustic resonator insert 802 is installed into the airfoil 800 and defines a plurality of resonator cells 814. The acoustic resonator insert 802 includes a face sheet 816 that defines a portion of the airfoil flow surfaces (e.g., exterior surface of the airfoil 800).

The face sheet 816 defines part of an external flow surface of the airfoil 800 when the acoustic resonator insert 802 is installed to the airfoil 800. The resonator cells 814 are fluidly connected to an external environment through one or more openings 818 formed in the face sheet 816. The openings 818 may be perforations formed in the face sheet 816, or may be a perforated sub-sheet assembled with the face sheet 816.

As shown in FIG. 8B, each resonator cell 814 includes a neck 820 and a respective backing chamber 822. The neck 820 includes and defines the opening 818 of the respective resonator cell 814, and fluidly connects the exterior environment to a volume $V_1$ defined within the backing chamber 822. In this illustrative embodiment, the neck 820 has a length of $l_1$ and a cross-sectional area of $a_1$. The backing chamber 822 has a volume $V_1$ and a cross-sectional area $A_1$. In contrast to the prior embodiment, the neck 820 is arranged outward from the backing chamber 822 and does not extend into the backing chamber 822. In some embodiments, the openings 818 may be the equivalent of a single perforation in a typical acoustic treatment (e.g., about 0.02 inches in diameter). In accordance with some embodiments of the present disclosure, each resonator cell 814 may be polygonal in cross-section (e.g., honeycomb) and each resonator cell 814 has one, and only one, opening 818 associated therewith. In some embodiments, the neck 820 may have a circular or non-circular cross-sectional geometry, and the illustrative and discussed geometries are not intended to be limiting, but rather are merely for illustrative and explanatory purposes. For example, in the configuration of FIG. 8B, it may be advantageous to have a neck structure that is a slot (e.g., having a high aspect ratio, rectangular cross-sectional geometry).

FIG. 8D illustrates the cross-sectional area $A_1$ and the rectangular slot shape of the openings 818. In this illustrative embodiment, the openings 818 are arranged at an aft-end of each resonator cell 814, with the opening into the backing chamber 822 being forward thereof. However, in other embodiments, the openings exposed to the external air may be arranged at a forward end and/or may be angled (instead of the radial orientation as shown). That is, the openings exposed to the external air may have any geometric shape and/or orientation which may be influenced, at least in part, by desired acoustic properties, part-life properties (e.g., thermal considerations, fatigue, etc.), and/or manufacturing/producibility constraints.

FIG. 8C illustrates a construction of the acoustic resonator insert 802. Specifically, as shown the face sheet 816 is installed to an insert frame 824. The insert frame 824 may have an exterior surface configured to be installed and attached to a receiving portion of an airfoil, as will be appreciated by those of skill in the art. Further, the insert frame 824 may define, in part, a portion of the walls or structure that defines the necks 820, once assembled. The other portion of the walls or structure that defines the necks 820 is provided by the face sheet 816. When the face sheet 816 is installed to the insert frame, the necks 820 will be defined and provide acoustic damping, as described above. Each resonator cell 814 is defined between the face sheet 816 and a back of the insert frame 824, when the face sheet 816 is installed to the insert frame 824. Although described with respect to this specific embodiment, it will be appreciated that the resonators cells of the present disclosure are defined between a face sheet and a back of an insert frame or between a face sheet and a material of a component defining a back wall of a respective backing chamber.

It is noted that the resonator cell 814 of FIGS. 8A-8C satisfies the geometric requirements and relationships described with respect to FIG. 5 and as otherwise described herein. As will be appreciated, in accordance with embodiments of the present disclosure, a resonator cell is constructed having a neck that is arranged relative to a backing chamber. In operation, acoustic vibrations will travel through air or other fluid into the neck, and then into the backing chamber, regardless of specific orientation, geometry, or arrangement of components. The primary functionality is achieved by a neck acoustically upstream relative to a backing chamber, with the backing chamber having a greater volume than the neck. The change in internal volumes from the upstream neck to the downstream backing chamber provides improved acoustic damping within a reduced total volume as compared to prior quarter wavelength acoustic resonator cells.

Figure 9:
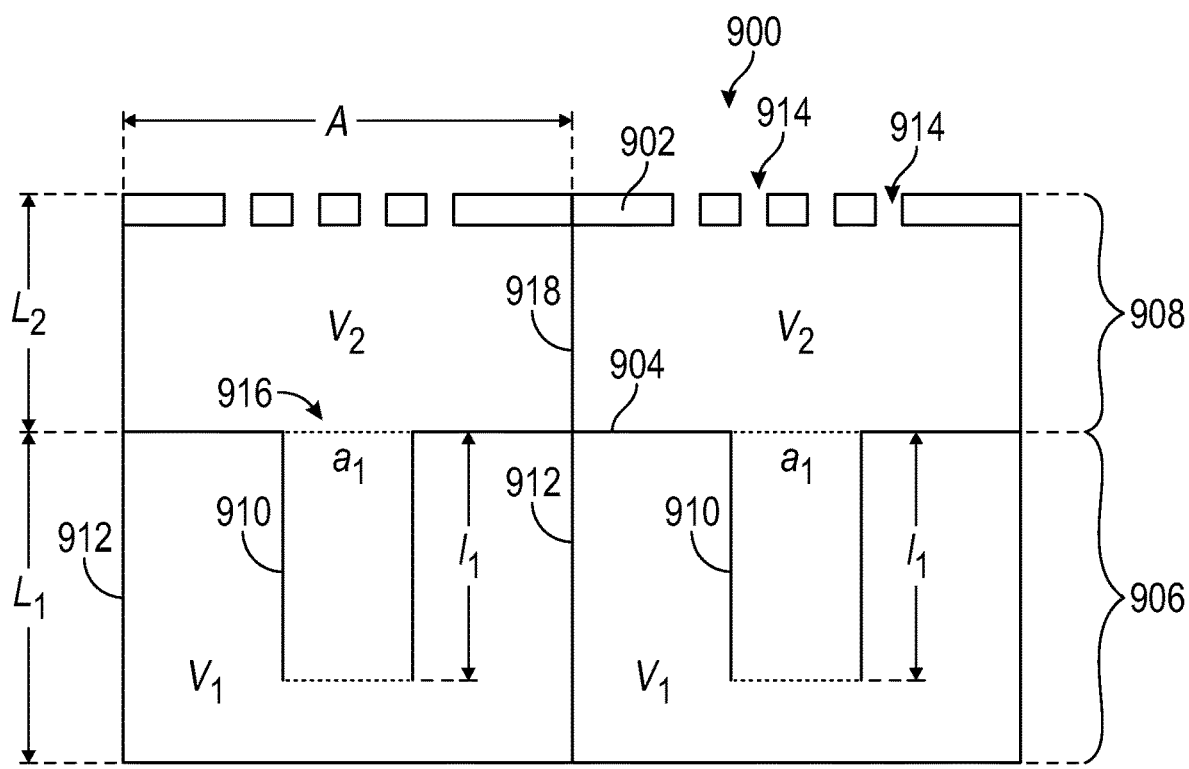
FIG. 9 is a schematic illustration of an acoustic treatment in accordance with an embodiment of the present disclosure.

Turning now to FIG. 9, a portion of an acoustic resonator 900 is schematically illustrated. The illustrated portion of the acoustic resonator 900 may be a portion of an acoustic resonator insert, such as shown and described above, or may be an integral part of a component, such as an airfoil or nacelle part. In the integral configurations of the present disclosure, the integral nature means that the acoustic resonator is formed as part of the structure of the component, such as by machining or additive manufacturing. More specifically, an integrally formed acoustic resonator of the present disclosure that cannot be removed from the component to which it is treating. This is in comparison to an insert which can be separately manufactured and installed and potentially removed therefrom after installation, as a complete and separate unit.

The acoustic resonator 900 of FIG. 9 includes a perforated outer sheet 902, a face sheet 904, and one or more resonator cells 906 arranged opposite the face sheet 904 from the perforated outer sheet 902. Between the face sheet 904 and the perforated outer sheet 902 is a conventional resonator region 908. When installed to a component and in operation, the perforated outer sheet 902 is exposed to the external environment and the face sheet 904 of the resonator cells 906 is not exposed directly to the external environment.

Each resonator cell 906 includes a neck 910 and a backing chamber 912. In this configuration, the neck 910 extends into the backing chamber 912. However, in other embodiments, the resonator cells 906 can have a neck-and-backing chamber configuration similar to that shown and described in FIGS. 8A-8C, or some other geometry and configuration, without departing from the scope of the present disclosure. The neck 910 has a length $l_1$ and a cross-sectional area of $a_1$. Similarly, the backing chamber 912 defines an interior volume of $V_1$.

In operation, vibration waves from an external environment may pass through perforations 914 in the perforated outer sheet and enter an outer volume $V_2$ defined by the conventional resonator region 908. The vibrational waves will then enter the necks 910 of the acoustic resonator cells 906 through openings 916 and travel into the interior volume $V_1$ of the acoustic resonator cells 906. This configuration allows for reduced impact to the face sheet 904 (e.g., due to hot gases) and/or reduce the amount of turbulence present at the openings 916 of the necks 910.

As shown in FIG. 9, there are two distinct acoustic resonator cells 906 with discrete or respective outer volumes $V_2$ associated therewith. In some alternative configurations, the divider 918 between the separate outer volumes $V_2$ may be eliminated such that a single large and open space is present between the perforated outer sheet 902 and the face sheet 904. As shown in FIG. 9, the outer volume $V_2$ has a depth of $L_2$ and the acoustic resonator cells 906 have a depth of $L_1$. A length $l_1$ of the necks 910 is selected to enable a reduction in, at least, the depth $L_1$ of the acoustic resonator cells 906, thus allowing for a reduced total size of the acoustic resonator 900. Advantageously, such configuration can be used to enable reduced sizes of the components to which the acoustic resonator is a part of (e.g., an airfoil). This illustrative configuration can enable both a reduced resonator depth while maintaining aerodynamic benefits of an outer sheet having numerous small scale perforation, as opposed to a single large preformation/aperture.

Figure 10:
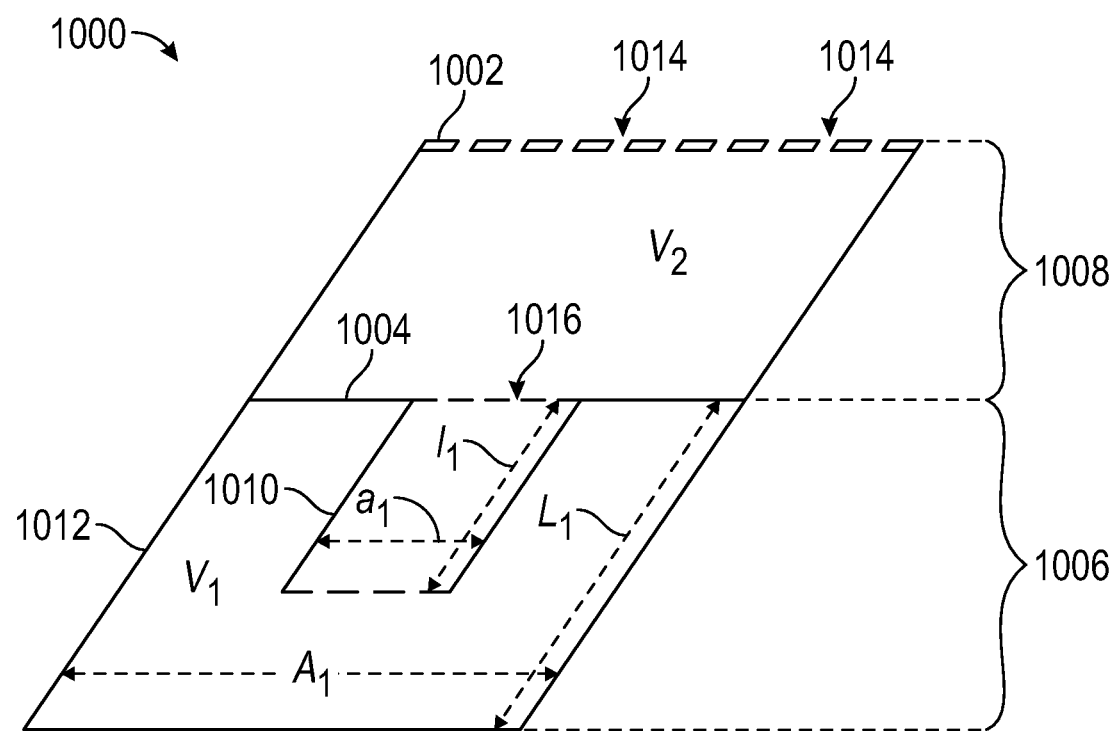
FIG. 10 is a schematic illustration of an acoustic treatment in accordance with an embodiment of the present disclosure.

Turning now to FIG. 10, a portion of an acoustic resonator 1000 is schematically illustrated. The illustrated portion of the acoustic resonator 100 may be a portion of an acoustic resonator insert, such as shown and described above, or may be an integral part of a component, such as an airfoil or nacelle part. In the integral configurations of the present disclosure, the integral nature means that the acoustic resonator is formed as part of the structure of the component, such as by machining or additive manufacturing. More specifically, an integrally formed acoustic resonator of the present disclosure that cannot be removed from the component to which it is treating. This is in comparison to an insert which can be separately manufactured and installed and potentially removed therefrom after installation, as a complete and separate unit.

Similar to that shown and described with respect to FIG. 9, the acoustic resonator 1000 of FIG. 10 includes a perforated outer sheet 1002, a face sheet 1004, and one or more resonator cells 1006 arranged opposite the face sheet 1004 from the perforated outer sheet 1002. Between the face sheet 1004 and the perforated outer sheet 1002 is a conventional resonator region 1008. When installed to a component and in operation, the perforated outer sheet 1002 is exposed to the external environment and the face sheet 1004 of the resonator cell 1006 is not exposed directly to the external environment.

The resonator cell 1006 includes a neck 1010 and a backing chamber 1012. In this configuration, the neck 1010 extends into the backing chamber 1012. The neck 1010 has a length $l_1$ and a cross-sectional area of $a_1$. Similarly, the backing chamber 1012 defines an interior volume of $V_1$, a backing chamber depth $L_1$, and a backing chamber cross-sectional area $A_1$. In this configuration, the geometry, shape, and orientation of the acoustic resonator 1000 of FIG. 10 is skewed as compared to prior configuration. The skewing may be employed for various reasons, including, not limited to, tailoring the acoustic damping for a specific application and/or to allow or facilitate certain manufacturing or producibility aspects (e.g., may allow for and/or facilitates additive manufacturing).

In accordance with embodiments of the present disclosure, the improved acoustic resonator cells have certain distinct features. For example, each acoustic resonator cell of the present disclosure has a backing chamber that defines a specific volume, a neck is arranged relative to the backing chamber, and the neck has a single opening, such that each acoustic resonator cell has one, and only one, opening to allow acoustic vibrations or waves to travel along the neck into the backing chamber.

Advantageously, embodiments described herein provide improved acoustic treatments and configurations for components of gas turbine engines. For example, embodiments of the present disclosure may enable a reduction of up to 70% of the required depth for acoustic damping as compared to convention quarter-wave resonator cells. Further, advantageously, embodiments of the present disclosure can maintain and/or improve the absorption bandwidth of acoustic vibrations, as compared to conventional quarter-wave resonator cells. Advantageously, a highly effective acoustic treatment may be applied to areas or surfaces in gas turbine engines (e.g., airfoils, nacelle components, etc.) for improved acoustic damping. Moreover, embodiments of the present disclosure enable the application of acoustic treatments to be applied to surfaces and structures where depth/space is a limiting factor.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An acoustic treatment for components of gas turbine engines, the acoustic treatment comprising:
    an acoustic resonator having:
        a backing chamber defining a respective volume; and
        a neck arranged relative to the backing chamber and defining an opening, wherein the neck has a length and a cross-sectional area,
    wherein the acoustic resonator cell satisfies the following relationships:
        (1) l/L=0.2-0.8, where l is a length of the neck and L is a depth of the backing chamber; and
        (2) a/A=0.02-0.20, where a is a cross-sectional area of the neck and A is a cross-sectional area of the backing chamber.

2. The acoustic treatment of claim 1, wherein a plurality of acoustic resonator cells are arranged to form an acoustic resonator insert.

3. The acoustic treatment of claim 2, wherein the acoustic resonator insert is installed to an airfoil.

4. The acoustic treatment of claim 2, wherein the acoustic resonator insert is installed to a nacelle component.

5. The acoustic treatment of claim 1, wherein the acoustic resonator includes a first acoustic resonator cell and a second acoustic resonator cell, wherein:
    the first acoustic resonator cell comprises the backing chamber and the neck; and
    the second acoustic resonator cell comprises a respective second backing chamber and a respective second neck,
    wherein the first acoustic resonator cell is stacked on the second acoustic resonator cell and the first backing chamber and the second backing chamber are fluidly connected through the second neck.

6. The acoustic treatment of claim 1, wherein the neck is arranged inside the backing chamber.

7. The acoustic treatment of claim 1, wherein the opening is the only fluid connection from an external environment into the backing chamber.

8. The acoustic treatment of claim 1, wherein the neck is arranged outward from the backing chamber and does not extend into the backing chamber.

9. The acoustic treatment of claim 1, wherein the acoustic resonator is integrally formed with the component.

10. The acoustic treatment of claim 1, further comprising:
a face sheet, wherein the opening is defined in the face sheet; and
an outer perforated sheet arranged opposite the backing chamber relative to the face sheet,
wherein a second volume is defined between the face sheet and the outer perforated sheet and the outer perforated sheet is configured to be exposed to an external environment during operation.

11. An acoustic treatment insert for components of gas turbine engines, the acoustic treatment insert comprising:
a face sheet;
an insert frame, wherein the face sheet is attached to the insert frame; and
an acoustic resonator arranged between the face sheet and a back of the insert frame, the acoustic resonator having:
a backing chamber defining a respective volume; and
a neck arranged relative to the backing chamber and defining an opening, wherein the neck has a length and a cross-sectional area,
wherein the acoustic resonator cell satisfies the following relationships:
(1) $l/L=0.2\text{-}0.8$, where $l$ is a length of the neck and $L$ is a depth of the backing chamber; and
(2) $a/A=0.02\text{-}0.20$, where $a$ is a cross-sectional area of the neck and $A$ is a cross-sectional area of the backing chamber.

12. The acoustic treatment insert of claim 11, wherein a plurality of acoustic resonator cells are arranged within the acoustic treatment insert.

13. The acoustic treatment insert of claim 12, wherein the acoustic resonator insert is installed to an airfoil.

14. The acoustic treatment insert of claim 12, wherein the acoustic resonator insert is installed to a nacelle component.

15. The acoustic treatment insert of claim 11, wherein the acoustic resonator includes a first acoustic resonator cell and a second acoustic resonator cell, wherein:
the first acoustic resonator cell comprises the backing chamber and the neck; and
the second acoustic resonator cell comprises a respective second backing chamber and a respective second neck,
wherein the first acoustic resonator cell is stacked on the second acoustic resonator cell and the first backing chamber and the second backing chamber are fluidly connected through the second neck.

16. The acoustic treatment insert of claim 11, wherein the neck is arranged inside the backing chamber.

17. The acoustic treatment insert of claim 11, wherein the opening is the only fluid connection from an external environment into the backing chamber.

18. The acoustic treatment insert of claim 11, wherein the neck is arranged outward from the backing chamber and does not extend into the backing chamber.

19. The acoustic treatment insert of claim 11, wherein the opening is defined in the face sheet and an outer perforated sheet is arranged opposite the backing chamber relative to the face sheet, wherein a second volume is defined between the face sheet and the outer perforated sheet and the outer perforated sheet is configured to be exposed to an external environment during operation.

20. The acoustic treatment insert of claim 11, wherein the face sheet is attached to the insert frame during assembly to define the neck.

* * * * *